Jan. 7, 1964 A. T. MacDONALD 3,117,263
AUTOMATIC POSITION CONTROL DEVICES
Filed April 29, 1958 3 Sheets-Sheet 1

Inventor
A. T. MacDonald
By Clarence Downing Seebold
Attys.

United States Patent Office 3,117,263
Patented Jan. 7, 1964

3,117,263
AUTOMATIC POSITION CONTROL DEVICES
Alexander Torrance MacDonald, Gerrards Cross, England, assignor to Electric & Musical Industries Limited, Hayes, Middlesex, England, a company of Great Britain
Filed Apr. 29, 1958, Ser. No. 731,705
Claims priority, application Great Britain Apr. 30, 1957
5 Claims. (Cl. 318—28)

This invention relates to positioning devices and especially to circuit arrangements for operating positioning devices employing zig-zag inductances.

One form of positioning device which employs zig-zag inductances is known as an inductosyn.

Basically an inductosyn comprises a moving slider which comprises a pair of zig-zag windings and a stator which comprises a single winding. There are in particular two types of inductosyn namely the linear inductosyn and the circular inductosyn and the mode of operation of these devices may be considered to be analogous to the mode of operation of a simple resolver element having a fixed stator carrying one winding and a rotor carrying quadratic windings requiring signals representing the sine and cosine of the angle to be fed to them for their operation.

Devices such as the inductosyn have however considerable advantages over a simple resolver when used in positioning, systems, since a substantially higher degree of accuracy may be achieved. With one type of inductosyn for example a displacement of 0.1" can correspond to an angular displacement of 360° and this may only be realised with a resolver element by means of gearing which is undesirable.

When employing an inductosyn certain practical limitations have hitherto been experienced and these limitations may also apply to other positioning devices.

Since the signal derived in the case of an inductosyn of "wavelength" or pitch 0.1 inch has a phase change of $2\pi$, ten times in every displacement of 1 inch the inductosyn alone has only been capable hitherto of controlling predetermined displacements within 0.1" and other means have had to be provided for controlling a greater displacement. The actual displacement which can reliably be produced by the inductosyn is moreover less than 0.05" since for displacements greater than or equal to this value there is a probability that the inductosyn will home to an incorrect position.

The object of the present invention is to reduce or substantially overcome the limitations indicated above and according to the present invention there is provided a circuit arrangement for operating a positioning device having a limited range of operation, comprising means for setting up a signal representing a coarse displacement, means for setting up a signal representing a fine displacement, means for counting pulses produced by said device in response to said coarse displacement to give an indication of said displacement, and means responsive to said counting means at the end of said coarse displacement for producing said fine displacement.

A feature of the present invention is that said counting means is selectively operative in response to the relative polarity of said signal representing a coarse displacement, to count pulses negatively or positively whereby displacements in either direction can be negotiated.

A further feature of the present invention is that said means for setting up a signal representing a fine displacement comprises a circuit whereby displacements greater than a predetermined displacement are represented by a signal representing said predetermined displacement, whereby said predetermined displacement is produced followed by a further displacement so that a displacement greater than said predetermined displacement is produced in discrete steps so that when an inductosyn is employed there is virtually no probability of the inductosyn homing to an incorrect position.

In order that the present invention may be clearly understood and readily carried into effect the invention will be described with reference to the accompanying drawings, in which.

Figure 1:
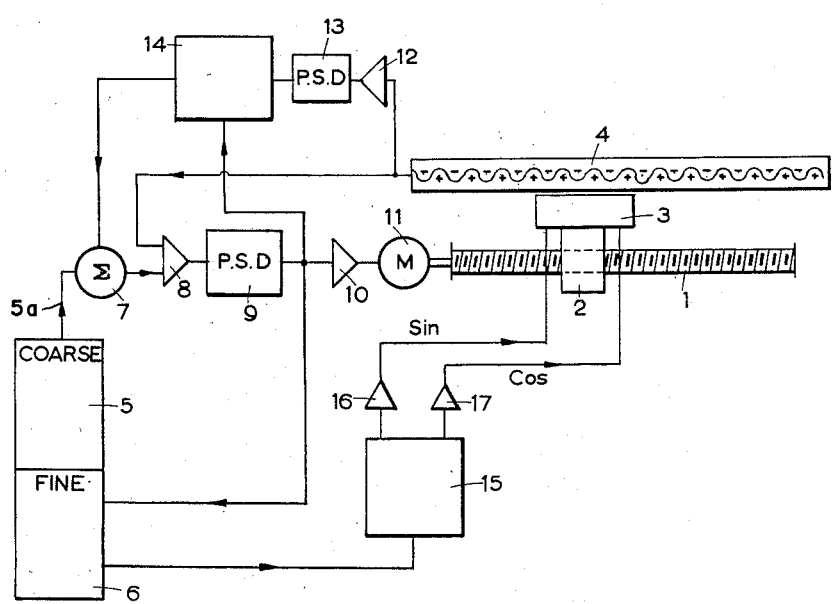
FIGURE 1 illustrates in diagrammatical form an example of a circuit arrangement according to an embodiment of the present invention.

Referring to FIGURE 1 it is assumed that the positioning device is operative to produce displacements of the worktable of a machine tool. The lead screw for the worktable is indicated as 1 in the drawing. Rotation of 1 causes the nut 2 to travel along 1 and produce the requisite displacement and attached to 2 is the slider 3 of the inductance element having a stator 4 as shown.

Rectangles 5 and 6 represent the coarse and fine setting units respectively for the positioning device, the coarse unit 5 has press-buttons which are operative to provide command signals representing displacements in steps of 10", 1" and 0.1" and the fine setting unit 6 carries press-buttons capable of providing signals representing displacements of steps of 0.01", 0.001" and 0.0001" respectively. As will become clear from FIGURE 3, the devices 5 and 6 comprise manually operated break-before-make switches which as will be seen hereafter operates relays to select alternating potentials from a transformer winding representing the required coarse and fine displacements respectively. The output from the coarse control signal unit is fed to a summing unit 7 and the output from this unit is fed to the amplifier 8, the output from which is fed via a conventional phase sensitive detector 9 and servo amplifier 10 to drive motor 11 which is coupled to the lead screw 1. The signal which is developed in the winding of 4 is fed of a second input to the amplifier 8 and also via the amplifier 12 and the phase sensitive detector 13 to a reversible pulse counter 14 whose output forms a second input to 7. The construction of the pulse counter 14 will be clear when reference is made to FIGURE 3 but in general it receives a controlling signal from the phase-sensitive detector 9 which provides an indication of the sense of counting required at any time. The outputs of the fine control unit 6 are applied to relays in a sine and cosine synthesiser 15 which for the purposes of the present description may comprise a number of potentiometers arranged in known manner to provide output signals representing the sine and cosine of an angle corersponding to that fine displacement instruction which is manually set up at 6, and the outputs of 15 are fed via amplifiers 16 and 17 to the two quadrature windings of the inductosyn slider 3. Preferably however 15 comprises an arrangements substantially as described in United States patent application Serial No. 730,961, filed April 25, 1958, now Patent No. 3,042,307

It will be understood that whilst the coarse positioning of the worktable is being performed, the manual setting of 6 is that corresponding to a fine displacement of zero so that in fact only the amplifier 17 of FIGURE 1 has a finite input (proportional to cos 0°), the amplifier 16 receiving a zero signal (proportional to sin 0°). Thus a substantially symmetrical modulation envelope waveform is derived from the scale of 4.

Figure 3:
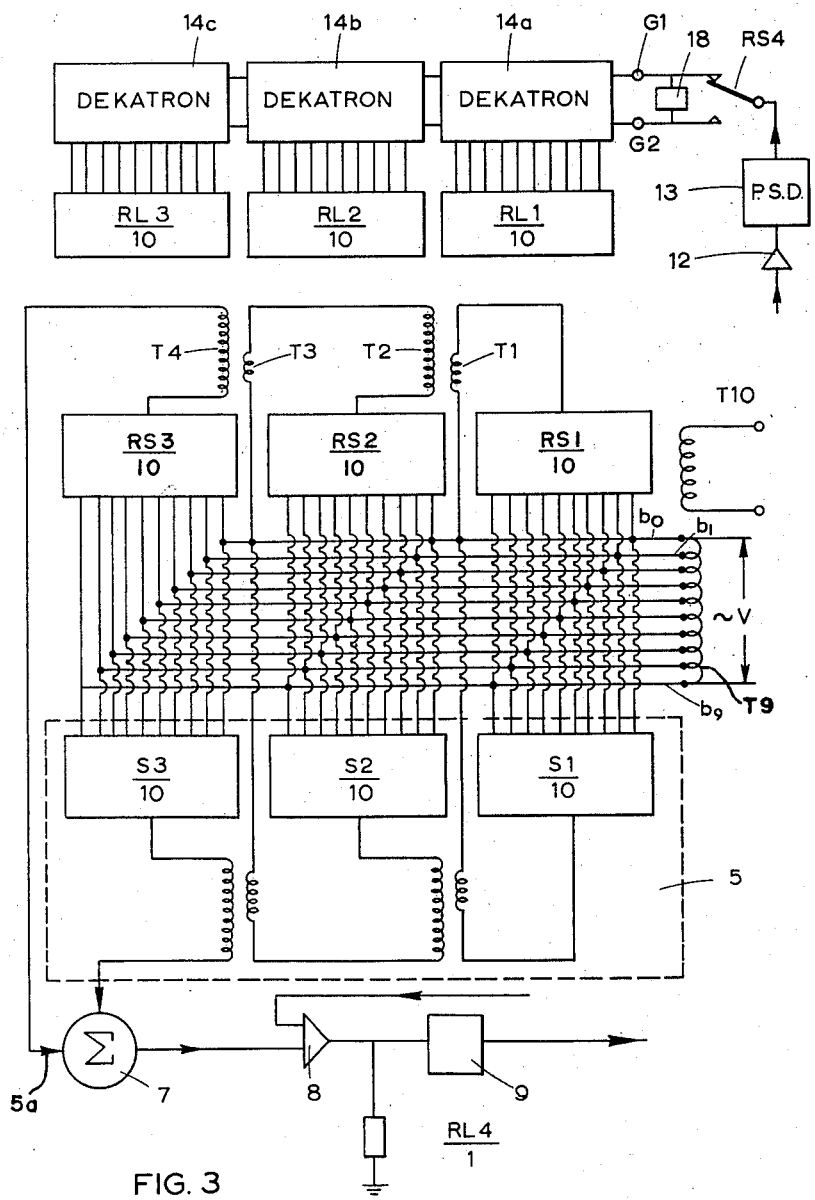
FIGURE 3 illustrates in greater detail part of the means for producing a course displacement as used in FIGURE 2.

Referring to FIGURE 3, this figure illustrates in greater detail the construction and the manner of operation of the coarse position setting arrangement shown in FIGURE 1. For convenience, the reference numerals are the same as those in FIGURE 1 where they correspond to the same components or units. Thus the amplifier 12, being of known form is again shown as a block, as also is the phase sensitive detector 13. The phase sensitive detector 13 has an output lead connected to the moveable contact of relay switch RS4 so that a high frequency signal applied to 12 causes lower frequency output pulses to be applied to one or other of the fixed contacts of RS4 in accordance with whether the direction of motion is forward or backward. As will be understood, this is sensed by the biassed relay RL4/1 in response to the output of the amplifier 8. These output pulses are then applied to the grid G1 or G2 of the first stage 14a of a dekatron counter. G1 and G2 are moreover connected by a delay network 18 which may be of any suitable form, such for example as a series of reactive T-sections or simple delay line. It is well known that dekatrons count in one direction or the other according to the order in which their grids are negatively pulsed. Associated with 14a are two further dekatron counter stages 14b and 14c, coupled together to give an accuracy of one in a thousand, but clearly for some purposes if the slider 4 is quite short, only two dekatron stages may be needed.

The cathodes of the respective dekatrons are connected respectively to the relays in three relay units RL1/10, RL2/10 and RL3/10, each of which comprises ten relays. Corresponding to these relays are relay switch units RS1, RS2 and RS3, each of which comprises ten relay switches for connecting one of ten busbars $b_0, b_1 \ldots b_9$ to an output lead. Clearly therefore, the switches in RS1, RS2 and RS3 are operated in dependence upon the position of the discharge in the respective dekatrons. The output lead of RS1 is connected via a transformer primary winding T1 to the busbar $b_0$. The output lead of RS2 is connected via a transformer secondary winding T2, coupled with T1, and a transformer primary winding T3 to $b_0$. The output lead of RS3 is connected via a transformer secondary winding T4, coupled with T3 to one input of the summing circuit 7. There is a reduction ratio of 10 to 1 between the transformer windings T1 and T2, and T3 and T4. The busbars $b_0, b_1 \ldots b_9$ are connected at equal intervals along a transformer winding T9 which receives an alternating reference voltage V at its terminals. Coupled with T9 furthermore is a transformer winding T10 which may be employed to provide a source of reference voltage for the fine control mechanism.

The coarse control unit 5 is shown within dotted rectangle 5 in FIGURE 3 and comprises three switch units S1, S2 and S3, which are interconnected by transformer windings giving a 10 to 1 reduction in the same manner as described above for RS1, RS2 and RS3, and they are moreover similarly connected to the busbars $b_0, b_1 \ldots b_9$. The switch units S1, S2 and S3 comprise switches of the break before make variety and can either be operated by push buttons in known manner or by turning a series of control knobs to appropriate positions. The output lead 5a from 5 is connected to the second input to 7. The output of 7 is connected as shown in FIGURE 1 to the amplifier 8, the output of 8 being fed to the phase sensitive detector 9.

In operation of FIGURE 3, as mentioned above, when a coarse displacement is being made, a reference signal proportional to cos 0° is applied to the zig-zag conductor of 3 which is connected to 17. As 3 moves relative to 4 the output of 4 is cyclically modulated, the modulation changing from a maximum in one phase of the reference signal to zero to a maximum in the other phase of the reference signal and to zero again. Each cycle of the modulation corresponds therefore to a displacement of one "turn" of the inductosyn scale 4 by the slider 3. Assuming therefore that the slider 3 is moving in a forward direction, the grid G1 receives a negative pulse at each cycle of the waveform at 12. Since however G2 is coupled to G1 by the delay network 18, the grid G2 receives the same pulse a short time afterwards. The time delay between the arrival of pulses at G1 and G2 is arranged to be such as is suitable for stepping the discharge in the dekatron 14a round by one position. If the sense of motion of 4 is in the opposition direction, clearly G2 receives a pulse before G1 and the dekatron counts in the reverse direction. The motion of the slider 3 continues until the signal derived from the busbars $b_0 \ldots b_9$ by the relay switches RS1, RS2 and RS3 is equal to the signal set up by manual operation of the course control unit 5. When this is achieved, the fine control unit 6 is put into operation. The operation of 6 will be described hereafter with reference to FIGURE 2.

The operation of the circuit arrangement of FIGURE 1 should now be readily understood. The coarse setting command signal is first set up on the coarse control unit 5 and a zero five setting is made on 6 by manually operating the appropriate controls and this produces an analogue signal representing a required displacement of the worktable and at the same time provides the reference signal for 3. The coarse analogue signal represents the required displacement to the nearest 0.1". The presence of this signal causes the servo amplifier 8 to respond to the coarse input namely that from 7 and the polarity of the signal is operative to set the phase sensitive detector 13 to produce output pulses corresponding to either the positive or negative portions of the modulation envelope received from 4 by 12 for the pulse counter 14. Although it is not shown in FIGURE 1 a velocity feedback loop of known form is preferably introduced into the servo system so that the worktable is stopped whenever the approximate coarse setting is reached without overshoot. The fine control unit is then operated to provide ouputs which are fed to the sine-cosine synthesiser 15 to provide signals suitable for operating the inductosyn in a normal manner. The servo amplifier is then responsive to the fine control signals.

Figure 2:
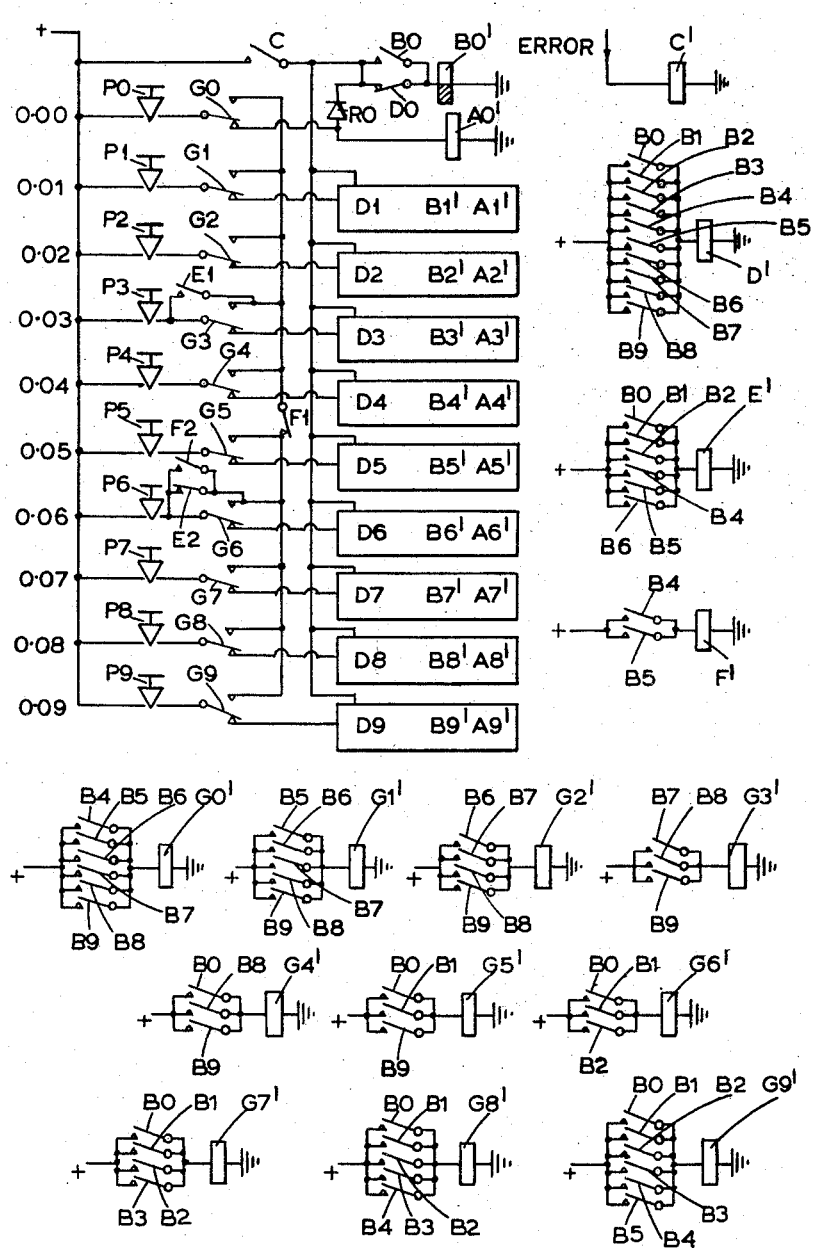
FIGURE 2 illustrates a circuit diagram of the means for setting up a signal representing a fine displacement suitable for use in the circuit arrangement of FIGURE 1.

Referring to FIGURE 2, which as aforementioned illustrates part of the fine control unit represented by block 6 in FIGURE 1, only those press-buttons which correspond to the displacement of 0.00 to 0.09 in steps of 0.01 are shown and these are represented by P0, P1, P2 ... P9. These switches are shown in the figure as being in the unactuated state. In the present description of FIGURE 2, relay operating units are shown with primes and respective relay switches associated with these relay operating units are shown without primes in order that the units and switches may be readily distinguished. Considering the relay switch G0 in the unactuated state, depression of button P0 causes a current to flow through a relay operating unit A0′ and also via the rectifier R0 and the relay switch D0 through a relay operating unit B0′. In the actuated state of G0 its moveable contact is connected to a line which is common to the contacts of all the other relay switches G1 ... G9 which correspond to the actuated states of these switches.

The relay unit B0 operates to actuate a relay switch D0 and B0′ is slugged in known manner so that when as will be seen later, an error signal is passed through the relay operating unit C′, the relay switch C is then operated and maintains switch B0 in the closed position. Associated with the contacts of G1, G2, G3 ... G9 which correspond to their unactuated state there are similar relay circuits comprising, for example R1, D1, B1′ and A1′ which correspond to R0, D0, B0′ and A0′ and so for the relay switch G0. These sections of the circuit are shown in block form for simplicity since they are identical in operation. Connected across the movable contact of G3 and the contact which corresponds to its actuated state there is connected a relay switch E1 which is operated to close in response to a signal received by the relay operating unit E' when any of B0, B1, B2, B4, B5 or B6 are operated. The relay unit E also operates in the opposite sense a relay switch E2 which is coupled across the movable contact of G6 and the contact which corresponds to its actuated state. In parallel with E2 is a relay switch F2 which is normally open and inserted in the common line which joins the contacts of G4 and G5 which correspond to their actuated states there is a relay switch F1 which is normaly closed. Relay switches F1 and F2 operate in response to a signal received by the relay unit F when B4 or B5 are closed. As will be clear from the figure, the relay unit D' is operated when any of switches B0, B1 ... B9 is operated and the relay unit G0' is energised whenever one of B4, B5, B6, B7, B8 and B9 is actuated, relay unit G1 is energised whenever one of B5, B6, B7, B8 or B9 is energised, relay unit G2 is energised whenever B6, B7, B8 or B9 is energised, relay unit G3' is energised whenever B7, B8 or B9 is actuated, relay unit G4 is energised whenever B0, B8 or B9 is actuated, relay unit G5' is actuated whenever B1, B0 or B9 is energised, relay unit B6' is energised whenever B0, B1, or B2 is actuated, relay unit G7' is energised whenever B0, B1, B2 or B3 is actuated, relay unit G8' is energised whenever B0, B1, B2, B3 or B4 is actuated and finally G9' is energised whenever one of the relay contacts B0, B1, B2, B3, B4 or B5 is actuated. Relay switches G1, G2 ... G9 operate to select in known manner tapping points on transformer windings in 15 to correspond to the sine and cosine of linear angular function of the displacements represented by the manual setting of 6. Although only a single lead is shown in FIGURE 1 between 6 and 15, this is in practice a plurality of leads one corresponding to each unit such as A0', A1' ... A9' for G0, G1 ... G9.

In order that the operation of FIGURE 2 may be fully appreciated it should be understood that the circuit is intended to prevent signals representing displacements of more than 0.03" from being fed to the displacement producing means which in this case is the servo-motor 11. The value .03" is chosen arbitrarily as being sufficiently removed from .05" to ensure that homing does not occur to an incorrect position. Thus the circuit arrangement of FIGURE 2 is so designed that when a fine displacement of greater than 0.03" is set up on the fine press-buttons, this displacement command signal from the point of view of the control system is initially made to appear as a command for a displacement of 0.03". When the displacement of 0.03" has been produced if the finally required displacement was originally greater than 0.06" then the displacement which is now required from the zero position is made to look like 0.06" for the displacement means and finally the full fine displacement is produced. Assuming at first that the coarse displacement has just been produced and a zero setting is initially made on the fine displacement buttons P0, P1 ... P9, clearly the relay units A0', B0', D', E', G4', G5', G6', G7', G8' and G9' are operated and the relay unit A0' selects output signals from the sine-cosine synthesiser 15 to represent a zero fine displacement. If P3 is now depressed P0 is released since by pressing one of the buttons P0 ... P9 it is arranged that any of the other buttons which is already depressed is automatically released and the relay unit A0' is then de-energized, whereas the relay unit A3' is energised and selects a fine displacement error signal corresponding to a displacement of 0.03" which is fed to the relay unit C'. Since P0 is released the relay unit B0' is de-energised but the relay unit B0' being slugged takes considerable time to release itself and meanwhile the relay switch C is closed and effectively holds in B0. The relay switches D0, D1, ... D9 are therefore actuated. The servo motor now drives the worktable and reduces the error signal to zero by producing the requisite displacement and the relay C is therefore released and consequently releases the relay unit B0', the relay units D, E, G4, G5, G6, G7, G8 and G9 are therefore also released.

The closing of switch D3 enables the relay unit B3' then to be operated and relay units D', G7', G8', and G9', are then re-energised. The rectifiers denoted by R0, R1, R2, ... R9 are necessary to prevent the corresponding relay units A03, A1', A2' ... A9' being operated in response to the presence of an error signal which closes the switch C.

Proceeding to a more complex case where the zero position setting is initially set up by P0, and the button P9 corresponding to a fine displacement of 0.09" is subsequently pressed, since the relay switch G9 is actuated together with E, the ouput error signal corresponding to a displacement of 0.03" is produced and the above described operations are effected. When the 0.03 position is reached and the relay unit B3' is operated the relay unit E' is de-energised so that E2 is closed and the error signal corresponding to a displacement of 0.06 is brought in.

A similar process now proceeds to reduce this error signal to zero and the relay switch B6 is eventually operated. When B6 is operated the relay switch G9 is finally released together with G7 and G8 and the error signal corresponding to a fine displacement of 0.09" is then brought into operation and the servo-motor then operates to reduce this signal to zero and the fine displacement of 0.09" is produced. Clearly, when either of the buttons P4, P5 and P6 is pressed a displacement of 0.03" is first produced after which the relay unit B3 is de-energised and one of the relay units B4', B5', or B6' is operated to produce the displacement corresponding to one of buttons P4, P5 or P6 respectively. The relay switches D0, D1 ... D9 are necessary in order that the requisite transition may be made between steps of 0.03" and are in the closed position between the release of C and the operation of the fresh relay switch which in one case may be B4, B5 or B7 or in another case may be one of B7, B8, or B9. Whilst an error signal is present the relay unit D' is energised so that only the particular B relay unit corresponding to the next displacement step to be made is operated. The relay switch F1 is opened in response to the actuation of B4 or B5 thus preventing the 0.03 control signal being provided when the 0.06 signal is provided after one of the buttons P7, P8 or P9 has been depressed.

Although the coarse displacement means has been described herein using dekatron counters, the invention is not limited to such counters since other types of counter may equally well be employed. For example reversible uniselectors may be used. Furthermore, although the sense of counting for the counters has been derived from the output of amplifier 8 the sense may equally well be derived from the tacho generator in the velocity feedback loop mentioned above but which for simplicity is not shown in the drawings.

Although the present invention has been described with reference to an inductosyn, the invention may not be limited to this type of position measuring device but the advantges of the invention can be fully appreciated with reference to an inductosyn which in the absence of the present invention may have certain undesirable limitations in particular in respect of range of operation.

What I claim is:

1. A position control apparatus comprising a first part the position of which is to be controlled, a second part with respect to which said first part is to be positioned, a servo motor for displacing said first part relative to said second part comprising a source of alternating voltage, a position sensitive circuit energised by said source and comprising a scale on one of said parts and an electrical slide on the other which co-operate to produce an alternating voltage output the amplitude of which varies cyclically with relative movement of said parts, each cycle of variation of amplitude corresponding to a unit of relative displacement of said parts, the maximum relative displacement of said parts being a plurality of said units, means for setting up a coarse displacement command signal representing an integral number of said units and means for setting up a fine displacement command signal representing a fraction of said unit, a counter for counting cycles of variation of the amplitude of said alternating voltage output, means for comparing said coarse displacement command signal with the count in said counter to produce a coarse error signal and means responsive to said fine displacement command signal for alternating the energisation of said position sensitive circuit to alter the phase relationship between the cycles of the amplitude variation of said alternating voltage output and the relative displacement of said parts whereby the amplitude of said alternating voltage output forms a fine error signal, said servo motor being responsive to said coarse and fine error signals to tend to reduce said error signals to zero.

2. Apparatus according to claim 1 comprising means for rendering said servo motor additionally responsive in successive steps to portions of the amplitude of said alternating voltage output each representing substantially less than one half a unit of relative displacement of said parts to tend to displace said first part to a position in which said amplitude corresponds to said fine displacement command signal.

3. Apparatus according to claim 1, said scale comprising a zig-zag conductor and said slide comprising two zig-zag conductors fixed relative to each other and inductively coupled to the conductor forming said scale.

4. Apparatus according to claim 3, comprising means for applying input signals corresponding to zero fine displacement to said zig-zag slide conductors, before said servo motor has annulled the difference between said coarse displacement signal and the count in said counter, means for applying alternating voltages having amplitudes proportional to the sine and cosine of said fraction to said zig-zag slide conductors after said servo-motor has annulled said difference, and means for rendering said servo-motor responsive to the amplitude of the alternating voltage induced in said scale conductor to tend to reduce that amplitude.

5. Apparatus according to claim 4, comprising an auto-transformer, means for applying a reference alternating voltage to said auto-transformer, said means for setting up a coarse displacement signal comprising a switching circuit for deriving an alternating voltage from said auto-transformer, and means for setting up a signal representing the number of cycles counted by said counter comprising a switching circuit for deriving alternating voltages from said auto-transformer.

References Cited in the file of this patent
UNITED STATES PATENTS

| | | |
|---|---|---|
| 2,785,353 | Fenemore | Mar. 12, 1957 |
| 2,849,668 | Tripp | Aug. 26, 1958 |
| 2,875,390 | Tripp | Feb. 24, 1959 |
| 2,907,938 | Hodger et al. | Oct. 6, 1959 |